(No Model.)

H. P. JENSEN & H. LARSEN.
CHAIN STANCHION.

No. 545,203. Patented Aug. 27, 1895.

Witnesses
E. H. Monroe
J. H. Riley

Inventors
Hans P. Jensen and
Hans Larsen.

By their Attorneys
C. A. Snow & Co.

UNITED STATES PATENT OFFICE.

HANS P. JENSEN AND HANS LARSEN, OF NEWELL, IOWA.

CHAIN STANCHION.

SPECIFICATION forming part of Letters Patent No. 545,203, dated August 27, 1895.

Application filed January 19, 1895. Serial No. 535,538. (No model.)

*To all whom it may concern:*

Be it known that we, HANS P. JENSEN and HANS LARSEN, citizens of the United States, residing at Newell, in the county of Buena Vista and State of Iowa, have invented a new and useful Chain Stanchion, of which the following is a specification.

The invention relates to improvements in stanchions.

The object of the present invention is to improve the construction of cattle-stanchions to enable animals to be released, either separately or simultaneously, and to provide an adjustable confining device adapted to accommodate different sizes of animals and capable of yielding to the movements of the confined animal to permit the same to either stand or lie down without inconvenience or annoyance.

The invention consists in the construction and novel combination and arrangement of parts hereinafter fully described, illustrated in the accompanying drawings, and pointed out in the claims hereto appended.

Figure 1:
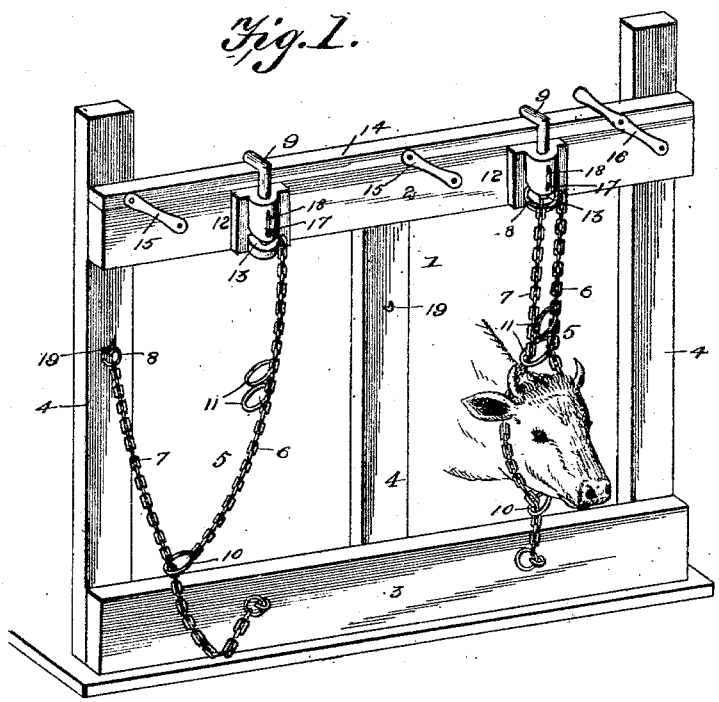
Figure 2:
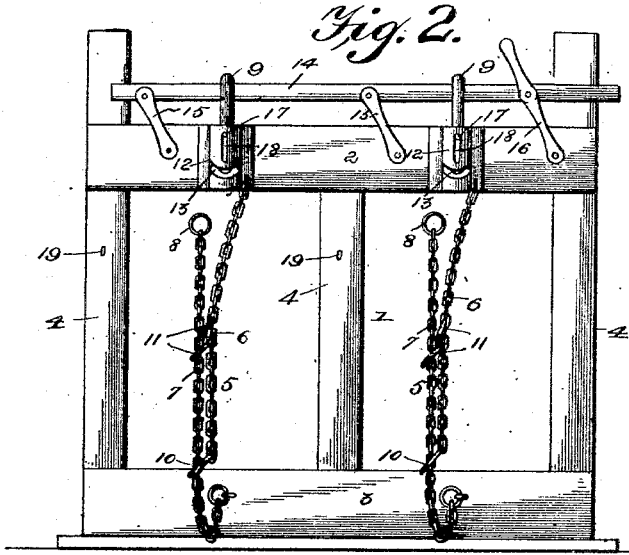

In the drawings, Figure 1 is a perspective view of a stanchion constructed in accordance with this invention. Fig. 2 is a front elevation partly in section, the parts being arranged for simultaneously releasing the animals.

Like numerals of reference indicate corresponding parts in both figures of the drawings.

1 designates a stanchion-frame comprising upper and lower horizontal bars or beams 2 and 3 and vertical posts 4, arranged at intervals and dividing the frame off into spaces for the reception of animals, and any number of such spaces and any size frame may be employed, as will be readily apparent.

At each of the spaces between the vertical posts is arranged a confining device 5, composed of flexible sides 6 and 7, constructed of chains, straps, ropes, or any similar material. The side 7 has its lower end permanently secured to the bottom of the stanchion-frame, and it is provided at its upper end with a ring or loop 8, adapted to be detachably secured to the top bar of the stanchion-frame by a bolt 9. The other side 6 of the confining device has its upper end permanently secured to the top of the stanchion-frame, and is provided at its lower end with a ring or loop 10, and it has intermediate of its ends rings 11. In confining an animal its neck is placed between the lower portion of the side 6, below the rings 11, and the other side 7, which has its free upper end passed through one of the rings or loops 11, whereby a neck-receiving loop is provided, and the ring 8 is then confined at the top of the stanchion-frame. The neck-receiving loop of the confining device is capable of vertical movement to permit an animal to raise and lower its head, as the rings 10 and 11 are adapted to slide freely on the side 7, as will be readily apparent. Any number of rings 11 may be provided, in order to obtain the desired degree of adjustment, but two will, in most instances, be found sufficient.

Each bolt 9 is L-shaped, and is mounted vertically in a substantially cylindrical housing or casing 12, which is provided with a securing-plate, and which has adjacent to its bottom an inclined slot 13, intersecting the bore or longitudinal opening of the casing and adapted to receive the ring 8, whereby the side 7 is detachably secured to the top of the stanchion-frame. The arms of the bolts 9 are disposed horizontally and rest upon the upper edge or face of a horizontally-disposed releasing-bar 14, mounted at the upper edge of the top bar 2 of the stanchion-frame and connected loosely with the same by means of links 15, having their upper terminals pivoted to the releasing-bar and their lower ends similarly secured to the stanchion-frame. The releasing-bar is raised above the top bar 2 by means of an operating-lever 16, fulcrumed at its lower end on the top bar of the stanchion-frame and pivoted intermediate of its ends to the releasing-bar and having its upper portion forming a handle. By moving the releasing-bar upward the bolts of the stanchion-frame are simultaneously raised to release the sides 7 of the confining devices, the rings 8 thereof sliding freely from the inclined slots of the bolt-casings. The upward movement of the releasing-bar is limited by projections 17, mounted on the shanks of the bolts and arranged in vertical slots 18 of the bolt-casings, and by this mechanism the links 15 are stopped before they reach a vertical position, whereby the weight of the releasing-bar will return the parts to their initial position, thereby dispensing with springs. The bolts are disposed vertically and have sufficient weight to cause them to fall to avoid the employment of springs for this purpose.

The stanchion-frame is provided with supporting-hooks 10, arranged on posts 4, and adapted to receive and hold the rings 8 of the sides 7 when the rings are not engaged by the bolts 9. By this construction the flexible sides 7 are retained in convenient position within easy reach of the operator.

It will be seen that the stanchion is simple and inexpensive in construction, that it is positive and reliable in its operation, and that the confining devices permit animals to move their heads freely vertically to enable them to stand or lie down without inconvenience and annoyance. It will also be clear that the animals may be released simultaneously, and that any one of the bolts may be raised independently to release the animals separately.

Changes in the form, proportion, and the minor details of construction may be resorted to without departing from the principle or sacrificing any of the advantages of this invention.

What we claim is—

1. The combination of a stanchion frame provided at its top with a horizontal bar 2, bolt casings mounted vertically on the bar 2 and provided with chain receiving slots, bolts disposed vertically in the casings and having a limited movement and provided at their upper ends with horizontal arms, a releasing bar arranged at the upper edge of the bar 2 and receiving the arms of said bolts on its upper edge, a link pivoted to the bar 2 and to the releasing bar, and an operating lever fulcrumed on the stanchion frame and connected with the releasing bar and adapted to swing the latter upward, whereby the bolts are simultaneously operated, substantially as described.

2. The combination of a stanchion frame, bolt casings mounted thereon and having inclined slots and provided with vertical slots, vertically disposed L-shaped bolts mounted on the casings, a horizontally disposed releasing bar located at the top of the stanchion frame beneath the arms of the bolts, a link connecting the releasing bar with the stanchion frame, and an operating lever similarly connected with the releasing bar and the stanchion frame, and projections mounted on the bolts and arranged in the vertical slots of the bolt casings and limiting the upward movement of the releasing bar, substantially as described.

In testimony that we claim the foregoing as our own we have hereto affixed our signatures in the presence of two witnesses.

HANS P. JENSEN.
HANS LARSEN.

Witnesses:
C. S. WARREN,
H. M. REDFIELD.